US010909711B2

(12) United States Patent
Schroeder et al.

(10) Patent No.: US 10,909,711 B2
(45) Date of Patent: Feb. 2, 2021

(54) RELOCALIZATION SYSTEMS AND METHODS

(71) Applicant: Magic Leap, Inc., Plantation, FL (US)

(72) Inventors: Brigit Schroeder, Plantation, FL (US);
Tomasz J. Malisiewicz, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 160 days.

(21) Appl. No.: 15/369,646

(22) Filed: Dec. 5, 2016

(65) Prior Publication Data
US 2017/0161919 A1 Jun. 8, 2017

Related U.S. Application Data

(60) Provisional application No. 62/263,529, filed on Dec. 4, 2015.

(51) Int. Cl.
*G06T 7/70* (2017.01)
*G06F 16/58* (2019.01)
(Continued)

(52) U.S. Cl.
CPC ............... *G06T 7/70* (2017.01); *G06F 16/58* (2019.01); *G06F 16/5838* (2019.01);
(Continued)

(58) Field of Classification Search
CPC .......... G06F 17/30265; G06K 9/00664; G06K 9/6273; G06K 9/66; G06N 3/08;
(Continued)

(56) References Cited

U.S. PATENT DOCUMENTS

| 4,462,165 A | 7/1984 | Lewis |
| 5,280,265 A | 1/1994 | Kramer et al. |

(Continued)

FOREIGN PATENT DOCUMENTS

| CA | 2358682 | 3/1994 |
| CN | 101093586 | 12/2007 |

(Continued)

OTHER PUBLICATIONS

PCT International Search Report and Written Opinion for International Appln. No. PCT/US16/65001, Applicant Magic Leap, Inc., forms PCT/ISA/210, 220, and 237, dated Feb. 16, 2017 (16 pages).

(Continued)

*Primary Examiner* — Gelek W Topgyal
(74) *Attorney, Agent, or Firm* — Vista IP Law Group, LLP

(57) ABSTRACT

A method of determining a pose of an image capture device includes capturing an image using an image capture device. The method also includes generating a data structure corresponding to the captured image. The method further includes comparing the data structure with a plurality of known data structures to identify a most similar known data structure. Moreover, the method includes reading metadata corresponding to the most similar known data structure to determine a pose of the image capture device.

15 Claims, 5 Drawing Sheets

(51) Int. Cl.
  *G06K 9/62* (2006.01)
  *G06K 9/00* (2006.01)
  *G06F 16/583* (2019.01)
  *G06N 3/04* (2006.01)
  *G06K 9/66* (2006.01)
  *G06N 3/08* (2006.01)
  *G06T 7/73* (2017.01)

(52) U.S. Cl.
  CPC ....... *G06K 9/00664* (2013.01); *G06K 9/6273* (2013.01); *G06K 9/66* (2013.01); *G06N 3/0454* (2013.01); *G06N 3/08* (2013.01); *G06T 7/74* (2017.01); *G06T 2207/20081* (2013.01); *G06T 2207/20084* (2013.01); *G06T 2207/30244* (2013.01)

(58) Field of Classification Search
  CPC . G06T 2207/20081; G06T 2207/20084; G06T 2207/30244; G06T 7/70; G06T 7/74
  See application file for complete search history.

(56) References Cited

U.S. PATENT DOCUMENTS

| | | |
|---|---|---|
| 5,583,974 A | 12/1996 | Winner et al. |
| 5,592,401 A | 1/1997 | Kramer |
| 5,684,498 A | 11/1997 | Welch et al. |
| 5,784,115 A | 7/1998 | Bozdagi |
| 5,930,741 A | 7/1999 | Kramer |
| 6,377,401 B1 | 4/2002 | Bartlett |
| 6,407,736 B1 | 6/2002 | Regan |
| 6,701,296 B1 | 3/2004 | Kramer et al. |
| 7,375,529 B2 | 5/2008 | Dupuis et al. |
| 7,443,154 B1 | 10/2008 | Merewether et al. |
| 8,165,352 B1 | 4/2012 | Mohanty et al. |
| 8,401,308 B2 * | 3/2013 | Nakamura ........... G06K 9/4642 382/203 |
| 8,950,867 B2 | 2/2015 | Macnamara |
| 9,013,505 B1 | 4/2015 | Thorton |
| 9,160,727 B1 | 10/2015 | Saylor et al. |
| 9,215,253 B1 | 12/2015 | Miller |
| 9,417,452 B2 | 8/2016 | Schowengerdt |
| 9,465,129 B1 | 10/2016 | Olsson et al. |
| 9,639,935 B1 | 5/2017 | Douady-Plevin et al. |
| 9,671,566 B2 | 6/2017 | Abovitz et al. |
| 9,791,700 B2 | 10/2017 | Schowengerdt |
| 9,814,430 B1 | 11/2017 | Berme et al. |
| 9,874,749 B2 | 1/2018 | Bradski et al. |
| 9,952,673 B2 | 4/2018 | Kramer et al. |
| 2001/0043738 A1 | 11/2001 | Sawney et al. |
| 2002/0033803 A1 | 3/2002 | Holzrichter et al. |
| 2002/0180727 A1 | 12/2002 | Guckenberger et al. |
| 2003/0092448 A1 | 5/2003 | Forstrom et al. |
| 2003/0120448 A1 | 7/2003 | Moriya et al. |
| 2003/0234823 A1 | 12/2003 | Sato et al. |
| 2004/0140949 A1 | 7/2004 | Takagi |
| 2004/0174337 A1 | 9/2004 | Kubota et al. |
| 2004/0201857 A1 | 10/2004 | Foxlin |
| 2005/0107870 A1 | 5/2005 | Wang et al. |
| 2005/0156601 A1 | 7/2005 | Dupuis et al. |
| 2006/0161871 A1 | 7/2006 | Hotelling et al. |
| 2006/0253804 A1 | 11/2006 | Fukushima et al. |
| 2007/0049374 A1 | 3/2007 | Ikeda et al. |
| 2007/0072674 A1 | 3/2007 | Ohta et al. |
| 2007/0126733 A1 | 6/2007 | Yang et al. |
| 2007/0298883 A1 | 12/2007 | Feldman et al. |
| 2008/0024523 A1 | 1/2008 | Tomite et al. |
| 2008/0133521 A1 | 6/2008 | Podilchuk |
| 2008/0275667 A1 | 11/2008 | Ohta |
| 2008/0309884 A1 | 12/2008 | O'Dor et al. |
| 2009/0005166 A1 | 1/2009 | Sato |
| 2009/0051653 A1 | 2/2009 | Barney et al. |
| 2009/0115406 A1 | 5/2009 | Anderson et al. |
| 2009/0173886 A1 | 7/2009 | Chowdhury |
| 2009/0184825 A1 | 7/2009 | Anderson |
| 2010/0066676 A1 | 3/2010 | Kramer et al. |
| 2010/0085423 A1 | 4/2010 | Lange |
| 2010/0103205 A1 | 4/2010 | Lisaka et al. |
| 2010/0141261 A1 | 7/2010 | Overby et al. |
| 2010/0302152 A1 | 12/2010 | Kirigaya |
| 2010/0309292 A1 | 12/2010 | Ho et al. |
| 2011/0018874 A1 | 1/2011 | Hasselgreen et al. |
| 2011/0025603 A1 | 2/2011 | Underkoffler et al. |
| 2011/0184950 A1 | 7/2011 | Skaff et al. |
| 2011/0199088 A1 | 8/2011 | Bittar et al. |
| 2011/0238399 A1 | 9/2011 | Ophir et al. |
| 2011/0248987 A1 | 10/2011 | Mitchell |
| 2011/0298748 A1 | 12/2011 | Chen et al. |
| 2012/0099800 A1 | 4/2012 | Llano et al. |
| 2012/0117076 A1 | 5/2012 | Austermann et al. |
| 2012/0194516 A1 | 8/2012 | Newcombe et al. |
| 2012/0236030 A1 | 9/2012 | Border et al. |
| 2012/0328196 A1 | 12/2012 | Kasahara et al. |
| 2013/0084984 A1 | 4/2013 | Gagner et al. |
| 2013/0117377 A1 | 5/2013 | Miller |
| 2013/0128230 A1 | 5/2013 | Macnamara |
| 2013/0169626 A1 | 6/2013 | Balan et al. |
| 2013/0230211 A1 * | 9/2013 | Tanabiki ............ G06K 9/00342 382/103 |
| 2013/0241773 A1 | 9/2013 | Laine |
| 2013/0278635 A1 | 10/2013 | Maggiore |
| 2013/0290222 A1 | 10/2013 | Gordo et al. |
| 2013/0312009 A1 | 11/2013 | Kramer et al. |
| 2013/0321462 A1 | 12/2013 | Salter et al. |
| 2013/0346168 A1 | 12/2013 | Zhou et al. |
| 2014/0006026 A1 | 1/2014 | Lamb et al. |
| 2014/0011589 A1 | 1/2014 | Barney et al. |
| 2014/0037140 A1 * | 2/2014 | Benhimane .......... G06K 9/6211 382/103 |
| 2014/0062841 A1 | 3/2014 | Ishikawa et al. |
| 2014/0075060 A1 | 3/2014 | Sharp et al. |
| 2014/0139226 A1 | 5/2014 | Jaaskelainen et al. |
| 2014/0145932 A1 | 5/2014 | Underkoffler et al. |
| 2014/0176591 A1 | 6/2014 | Klein et al. |
| 2014/0181587 A1 | 6/2014 | Sridharan et al. |
| 2014/0195988 A1 | 7/2014 | Kramer et al. |
| 2014/0212027 A1 | 7/2014 | Hallquist et al. |
| 2014/0222409 A1 | 8/2014 | Efrat et al. |
| 2014/0225822 A1 | 8/2014 | Underkoffler et al. |
| 2014/0267420 A1 | 9/2014 | Schowengerdt et al. |
| 2014/0267646 A1 | 9/2014 | Na'Aman et al. |
| 2014/0285375 A1 | 9/2014 | Crain |
| 2014/0298269 A1 | 10/2014 | Underkoffler et al. |
| 2014/0306866 A1 | 10/2014 | Miller |
| 2014/0321702 A1 | 10/2014 | Schmalstieg |
| 2014/0323148 A1 | 10/2014 | Schmalstieg et al. |
| 2014/0325373 A1 | 10/2014 | Kramer et al. |
| 2014/0354548 A1 | 12/2014 | Lee |
| 2015/0002542 A1 | 1/2015 | Chan et al. |
| 2015/0019651 A1 | 1/2015 | Kazi et al. |
| 2015/0040074 A1 | 2/2015 | Hofmann et al. |
| 2015/0077326 A1 | 3/2015 | Kramer et al. |
| 2015/0092015 A1 | 4/2015 | Stafford |
| 2015/0100380 A1 | 4/2015 | Jones, Jr. et al. |
| 2015/0100593 A1 | 4/2015 | Underkoffler et al. |
| 2015/0161476 A1 * | 6/2015 | Kurz .................. G06K 9/4671 382/190 |
| 2015/0163345 A1 | 6/2015 | Cornaby et al. |
| 2015/0172568 A1 | 6/2015 | Choe et al. |
| 2015/0177831 A1 | 6/2015 | Chan et al. |
| 2015/0178554 A1 | 6/2015 | Kanaujia et al. |
| 2015/0178939 A1 | 6/2015 | Bradski et al. |
| 2015/0205126 A1 | 7/2015 | Schowengerdt |
| 2015/0205364 A1 | 7/2015 | Underkoffler et al. |
| 2015/0205388 A1 | 7/2015 | Osterhout |
| 2015/0215611 A1 | 7/2015 | Wu et al. |
| 2015/0221133 A1 | 8/2015 | Groten et al. |
| 2015/0243080 A1 | 8/2015 | Steinbach et al. |
| 2015/0262372 A1 | 9/2015 | Cardoso et al. |
| 2015/0302652 A1 | 10/2015 | Miller et al. |
| 2015/0310310 A1 | 10/2015 | Hesch |
| 2015/0324198 A1 | 11/2015 | Alsup et al. |
| 2015/0339857 A1 | 11/2015 | O'Connor et al. |

(56) References Cited

U.S. PATENT DOCUMENTS

| | | |
|---|---|---|
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1* | 1/2016 | Kezele ............... G06T 19/006 345/633 |
| 2016/0016752 A1 | 1/2016 | Helseth et al. |
| 2016/0018896 A1 | 1/2016 | Kramer et al. |
| 2016/0026253 A1 | 1/2016 | Bradski et al. |
| 2016/0041048 A1 | 2/2016 | Blum et al. |
| 2016/0147065 A1 | 5/2016 | Border et al. |
| 2016/0171644 A1 | 6/2016 | Gruber |
| 2016/0180151 A1* | 6/2016 | Philbin ............... G06K 9/00288 382/118 |
| 2016/0180592 A1 | 6/2016 | Bean et al. |
| 2016/0189680 A1 | 6/2016 | Paquette |
| 2016/0203624 A1 | 7/2016 | Anderson |
| 2016/0210783 A1 | 7/2016 | Tomlin et al. |
| 2016/0259032 A1 | 9/2016 | Hehn |
| 2016/0259404 A1 | 9/2016 | Woods |
| 2016/0262608 A1 | 9/2016 | Krueger |
| 2016/0282619 A1 | 9/2016 | Oto |
| 2016/0294958 A1 | 10/2016 | Zhang et al. |
| 2016/0299567 A1 | 10/2016 | Crisler et al. |
| 2016/0378863 A1* | 12/2016 | Shlens ............... G06F 17/30784 707/769 |
| 2016/0379092 A1* | 12/2016 | Kutliroff ............ G06N 3/04 382/158 |
| 2017/0011555 A1 | 1/2017 | Li et al. |
| 2017/0032220 A1* | 2/2017 | Medasani ............ G06T 7/74 |
| 2017/0076328 A1 | 3/2017 | Suzuki |
| 2017/0098406 A1 | 4/2017 | Kobayashi |
| 2017/0109916 A1 | 4/2017 | Kurz et al. |
| 2017/0148206 A1 | 5/2017 | Donner et al. |
| 2017/0161853 A1 | 6/2017 | Gossweiler et al. |
| 2017/0184387 A1 | 6/2017 | Lefevre et al. |
| 2017/0205903 A1 | 7/2017 | Miller et al. |
| 2017/0243324 A1 | 8/2017 | Mierle et al. |
| 2017/0345220 A1 | 11/2017 | Bates |
| 2017/0345398 A1 | 11/2017 | Fuchs et al. |
| 2018/0039083 A1 | 2/2018 | Miller et al. |
| 2018/0047332 A1 | 2/2018 | Kuwahara |
| 2018/0107346 A1 | 4/2018 | Wilson |
| 2018/0213359 A1 | 7/2018 | Reinhardt et al. |
| 2018/0268518 A1 | 9/2018 | Nourai et al. |
| 2018/0268519 A1 | 9/2018 | Liebenow et al. |
| 2018/0268610 A1 | 9/2018 | Nourai et al. |
| 2018/0365882 A1 | 12/2018 | Croxsford et al. |
| 2019/0015167 A1 | 1/2019 | Draelos et al. |
| 2019/0056693 A1 | 2/2019 | Gelman et al. |
| 2019/0066365 A1 | 2/2019 | Schmalstieg et al. |
| 2019/0155374 A1 | 5/2019 | Miller et al. |
| 2019/0333263 A1 | 10/2019 | Melkote Krishnaprasad et al. |
| 2019/0355176 A1 | 11/2019 | Evans |
| 2020/0005517 A1 | 1/2020 | Anderson et al. |
| 2020/0027194 A1 | 1/2020 | Nourai et al. |
| 2020/0184712 A1 | 6/2020 | Schmalstieg et al. |

FOREIGN PATENT DOCUMENTS

| | | |
|---|---|---|
| CN | 101530325 | 9/2009 |
| CN | 103792661 | 5/2014 |
| CN | 104011788 | 8/2014 |
| EP | 2887311 | 6/2015 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Non-Final Office Action for U.S. Appl. No. 14/641,376 dated Apr. 14, 2016.

Final Office Action for U.S. Appl. No. 14/641,376 dated Nov. 14, 2016.

PCT International Search Report and Written Opinion for International Appln. No. PCT/US15/19339, Applicant Magic Leap, Inc., Forms PCT/ISA/210, 220, and 237, dated Jun. 24, 2015 (10 pages).

PCT International Search Report and Written Opinion for International Appln. No. PCT/US16/21095, Applicant Magic Leap, Inc., forms PCT/ISA/210, 220, and 237, dated May 31, 2016 (12 pages).

PCT International Search Report and Written Opinion for International Appln. No. PCT/US2017/016722, Applicant Magic Leap, Inc., forms PCT/ISA/210, 220, and 237, dated Feb. 6, 2017 (24 pages).

Response to Non-Final office action filed Sep. 12, 2016 for U.S. Appl. No. 14/641,376.

Response to Final Office action filed Mar. 14, 2017 for U.S. Appl. No. 14/641,376.

Notice of Allowance dated Aug. 14, 2017 for U.S. Appl. No. 14/641,376.

Preliminary Amendment filed Aug. 24, 2017 for U.S. Appl. No. 15/425,837.

Non-Final Office Action dated Dec. 6, 2017 for U.S. Appl. No. 15/062,104.

Voluntary Amendment for Canadian Appln. No. 2979560 filed Oct. 6, 2017, 24 pages.

Voluntary Amendment for Japanese Appln. No. 2017-546703 filed Nov. 7, 2017, 7 pages.

Response to Non-Final office action filed Mar. 6, 2018 for U.S. Appl. No. 15/062,104.

Final Office Action filed Apr. 30, 2018 for U.S. Appl. No. 15/062,104.

Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.

Non-Final Office Action filed Apr. 5, 2018 for U.S. Appl. No. 15/425,837.

Response to Non-Final Office Action filed Jul. 5, 2018 for U.S. Appl. No. 15/425,837.

Pre appeal brief filed Aug. 30, 2018 for U.S. Appl. No. 15/062,104.

Notice of Allowance dated Sep. 6, 2018 for U.S. Appl. No. 15/425,837.

Extended European Search Report dated Oct. 16, 2018 for EP Application No. 16759643.6.

Amendment After Allowance dated Nov. 15, 2018 for U.S. Appl. No. 15/425,837.

Extended European Search Report dated Jan. 7, 2019 for EP Application No. 16871733.8.

Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.

Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.

Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.

Alex Kendall et al.: PoseNet: A Convolutional Network for Real-Time 6-DOF Camera Relocalization,https://arxiv.org/pdf/1505.07427v3.pdf, Nov. 23, 2015; XP055536871.

Extended European Search Report dated Jan. 17, 2019 for EP Application No. 17748352.6.

(56) References Cited

OTHER PUBLICATIONS

Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Lect Notes Computer; Springer International Publishing, CH, XP047148654.
Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (12 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response Non Final Office action filed Sep. 12, 2019 for U.S. Appl. No. 15/924,011.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.
Non-Final Office Action dated Oct. 31, 2019 for U.S. Appl. No. 15/923,560.
RCE and Response to Final Office Action filed Nov. 11, 2019 for U.S. Appl. No. 15/924,078.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrieved electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments: Scalable algorithm for resolving incorrect occlusion", Computer-Aided Civil and Infrastructure Engineering, vol. 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.
Amendment After non-final Office Action for U.S. Appl. No. 15/924,078 dated Apr. 13, 2020.
Final Office Action for U.S. Appl. No. 15/877,359 dated Apr. 16, 2020.

(56) References Cited

OTHER PUBLICATIONS

Amendment After non-final Office Action for U.S. Appl. No. 16/220,630 dated Apr. 27, 2020.
Foreign Office Action for Japanese Patent Appln. No. 2017-546703 dated Mar. 10, 2020.
Foreign Office Action for Israeli Patent Application No. 259766 dated Mar. 1, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Jiang, P., etc., "Electro-magnetic Tracking System for Capsule-typed Telemetric Device", Optics and Precision Engineering, vol. 15, No. 6, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 15/924,078 dated May 18, 2020.
Notice of Allowance for U.S. Appl. No. 16/220,630 dated Jun. 8, 2020.
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Notice of Allowance for U.S. Appl. No. 16/848,496 dated Aug. 24, 2020.
Foreign Office Action for KR Patent Appln. No. 10-2019-7006281 dated Aug. 28, 2020.
Foreign Office Action for JP Patent Application No. 2019-505238 dated Sep. 10, 2020 (no translation available).
Non-Final Office Action for U.S. Appl. No. 16/945,613 dated Sep. 3, 2020.
Notice of Allowance for U.S. Appl. No. 16/220,630 dated Sep. 11, 2020.
Notice of Allowance for U.S. Appl. No. 16/220,630 dated Sep. 23, 2020.
1st Examination Report for AU Patent Appln. No. 2017214748 dated Oct. 14, 2020.
Non-Final Office Action for U.S. Appl. No. 16/809,346 dated Oct. 16, 2020.
Non-Final Office Action for U.S. Appl. No. 16/518,431 dated Oct. 27, 2020.
Foreign Exam Report for EP Patent Appln. No. 18742228.2 dated Oct. 1, 2020.
Foreign OA Response for EP Patent Appln. No. 17837488.0 dated Nov. 20, 2020.
Foreign OA Response for IL Patent Application No. 259766 dated Nov. 25, 2020.
1st Exam Report for AU Patent Application No. 2016365422 dated Nov. 4, 2020.
Foreign OA Response for JP Patent Application No. 2019-505238 dated Dec. 1, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et al: "An improved z-buffer CSG rendering algorithm", Proceedings of the Eurographics / SIGGRAPH Workshop on Graphics Hardware. Lisbon, Aug. 31-Sep. 1, 1998; pp. 25-30, XP058111343.
Wolberg G et al: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms A Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.
Foreign OA Response for KR Patent Appln. No. 10-2019-7006281 dated Oct. 28, 2020.
Notice of Allowance for U.S. Appl. No. 16/938,578 dated Nov. 19, 2020.
Notice of Allowance for U.S. Appl. No. 16/848,496 dated Nov. 2, 2020.
Response to Non-Final Office Action for U.S. Appl. No. 16/945,613, filed Dec. 3, 2020.
Foreign Final OA for JP Patent Appln. No. 2017-546703 dated Nov. 20, 2020.
Foreign OA for KR Patent Appln. No. 10-2019-7006281 dated Dec. 15, 2020.
Foreign Exam Report for AU Patent Appln. No. 2017305227 dated Dec. 16, 2020.

* cited by examiner

RELOCALIZATION SYSTEMS AND METHODS

CROSS-REFERENCE TO RELATED APPLICATION

This application claims priority to U.S. Provisional Application Ser. No. 62/263,529 filed on Dec. 4, 2015 entitled "RELOCALIZATION SYSTEMS AND METHODS,". The present application includes subject matter similar to that described in U.S. Utility patent application Ser. No. 15/150, 042 filed on May 9, 2016 entitled "DEVICES, METHODS AND SYSTEMS FOR BIOMETRIC USER RECOGNITION UTILIZING NEURAL NETWORKS,". The contents of the aforementioned patent application are hereby expressly and fully incorporated by reference in their entirety, as though set forth in full.

The subject matter herein may be employed and/or utilized with various systems, such as those wearable computing systems and components thereof designed by organizations such as Magic Leap, Inc. of Fort Lauderdale, Fla. The following documents are hereby expressly and fully incorporated by reference in their entirety, as though set forth in full: U.S. patent application Ser. No. 14/641,376; U.S. patent application Ser. No. 14/555,585; U.S. patent application Ser. No. 14/205,126; U.S. patent application Ser. No. 14/212, 961; U.S. patent application Ser. No. 14/690,401; U.S. patent application Ser. No. 13/663,466; and U.S. patent application Ser. No. 13/684,489.

FIELD OF THE INVENTION

The present disclosure relates to devices, methods and systems for localization of pose sensitive systems. In particular, the present disclosure relates to devices, methods and systems for relocalization of pose sensitive systems that have either lost and/or yet to established a system pose.

BACKGROUND

An increasing number of systems require pose information for the systems to function optimally. Examples of systems that require pose information for optimal performance include, but are not limited to, robotic and mixed reality (MR) systems (i.e., virtual reality (VR) and/or augmented reality (AR) systems). Such systems can be collectively referred to as "pose sensitive" systems. One example of pose information is spatial information along six degrees of freedom that locates and orients the pose sensitive system in three-dimensional space.

Pose sensitive systems may become "lost" (i.e., lose track of the system pose) after various events. Some of these events include: 1. Rapid camera motion (e.g., in an AR system worn by a sports participant); 2. Occlusion (e.g., by a person walking into a field of view); 3. Motion-blur (e.g., with rapid head rotation by an AR system user); 4. Poor lighting (e.g., blinking lights); 5. Sporadic system failures (e.g., power failures); and 6. Featureless environments (e.g., rooms with plain walls). Any of these event and many others can drastically affect feature-based tracking such as that employed by current simultaneous localization and mapping ("SLAM") systems with robust tracking front-ends, thereby causing these systems to become lost.

Accordingly, relocalization (i.e., finding a system's pose in a map when the system is "lost" in a space that has been mapped) is a challenging and key aspect of real-time visual tracking. Tracking failure is a critical problem in SLAM systems and a system's ability to recover (or relocalize) relies upon its ability to accurately recognize a location, which it has previously visited.

The problem of image based localization in robotics is commonly referred to as the Lost Robot problem (or the Kidnapped Robot problem). The Lost Robot problem is also related to both the Wake-up Robot problem and Loop Closure detection. The Wake-up Robot problem involves a system being turned on for the first time. Loop Closure detection involves a system that is tracking successfully, revisiting a previously visited location. In Loop Closure detection, the image localization system must recognize that the system has visited the location before. Such Loop Closure detections help prevent localization drift and are important when building 3D maps of large environments. Accordingly, pose sensitive system localization is useful in situations other than lost system scenarios.

MR systems (e.g., AR systems) have even higher localization requirements than typical robotic systems. The devices, methods and systems for localizing pose sensitive systems described and claimed herein can facilitate optimal function of all pose sensitive systems.

SUMMARY

In one embodiment directed to a method of determining a pose of an image capture device, the method includes capturing an image using an image capture device. The method also includes generating a data structure corresponding to the captured image. The method further includes comparing the data structure with a plurality of known data structures to identify a most similar known data structure. Moreover, the method includes reading metadata corresponding to the most similar known data structure to determine a pose of the image capture device.

In one or more embodiments, the data structure is a compact representation of the captured image. The data structure may be an N dimensional vector. The data structure may be a 128 dimensional vector.

In one or more embodiments, generating the data structure corresponding to the captured image includes using a neural network to map the captured image to the N dimensional vector. The neural network may be a convolutional neural network.

In one or more embodiments, each of the plurality of known data structures is a respective known N dimensional vector in an N dimensional space. Each of the plurality of known data structures may be a respective known 128 dimensional vector in a 128 dimensional space.

The data structure may be an N dimensional vector. Comparing the data structure with the plurality of known data structures to identify the most similar known data structure may include determining respective Euclidean distances between the N dimensional vector and each respective known N dimensional vector. Comparing the data structure with the plurality of known data structures to identify the most similar known data structure may also include identifying a known N dimensional vector having a smallest distance to the N dimensional vector as the most similar known data structure.

In one or more embodiments, the method also includes training a neural network by mapping a plurality of known images to the plurality of known data structures. The neural network may be a convolutional neural network. Training the neural network may include modifying the neural network based on comparing a pair of known images of the plurality.

In one or more embodiments, training the neural network comprises modifying the neural network based on comparing a triplet of known images of the plurality. Each known image of the plurality may have respective metadata, including pose data. Training the neural network may include accessing a database of the known images annotated with the respective metadata. The pose data may encode a translation and a rotation of a camera corresponding to a known image.

In one or more embodiments, each known data structure of the plurality is a respective known N dimensional vector in an N dimensional space. A first known image of the triplet may be a matching image for a second known image of the triplet. A third known image of the triplet may be a non-matching image for the first known image of the triplet. A first Euclidean distance between respective first and second pose data corresponding to the matching first and second known images may be less than a predefined threshold. A second Euclidean distance between respective first and third pose data corresponding to the non-matching first and third known images may be more than the predefined threshold.

In one or more embodiments, training the neural network includes decreasing a first Euclidean distance between first and second known N dimensional vectors respectively corresponding to the matching first and second known images in an N dimensional space. Training the neural network may also include increasing a second Euclidean distance between first and third known N dimensional vectors respectively corresponding to the non-matching first and third known images in the N dimensional space.

In one or more embodiments, the method also includes comparing the data structure with the plurality of known data structures to identify the most similar known data structure in real time. The metadata corresponding to the most similar known data structure may include pose data corresponding to the most similar known data structure. The method may also include determining a pose of the image capture device from the pose data in the metadata of the most similar known data structure.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
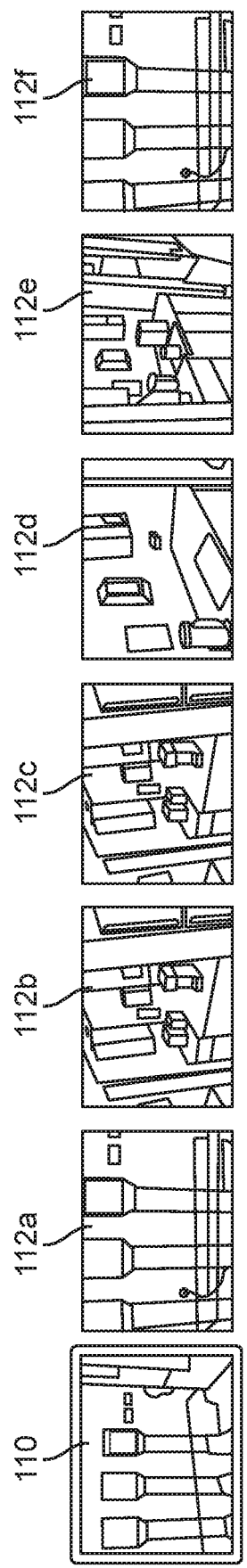
FIG. 1 is a schematic view of a query image and six known images for a localization/relocalization system, according to one embodiment.

Various embodiments of the invention are directed to methods, systems, and articles of manufacture for localizing or relocalizing a pose sensitive system (e.g., an augmented reality (AR) system) in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Localization/Relocalization Systems and Methods

Various embodiments of augmented reality display systems have been discussed in co-owned U.S. Utility patent application Ser. No. 14/555,585 filed on Nov. 27, 2014 entitled "VIRTUAL AND AUGMENTED REALITY SYSTEMS AND METHODS," and co-owned U.S. Prov. Patent Application Ser. No. 62/005,834 filed on May 30, 2014 entitled "METHODS AND SYSTEM FOR CREATING FOCAL PLANES IN VIRTUAL AND AUGMENTED REALITY," the contents of the aforementioned U.S. patent applications are hereby expressly and fully incorporated herein by reference as though set forth in full. Localization/relocalization systems may be implemented independently of AR systems, but many embodiments below are described in relation to AR systems for illustrative purposes only.

Disclosed are devices, methods and systems for localizing/relocalizing pose sensitive systems. In one embodiment, the pose sensitive system may be a head-mounted AR display system. In other embodiments, the pose sensitive system may be a robot. Various embodiments will be described below with respect to localization/relocalization of a head-mounted AR system, but it should be appreciated that the embodiments disclosed herein may be used independently of any existing and/or known AR system.

For instance, when an AR system "loses" its pose tracking after it experiences one of the disruptive events described above (e.g., rapid camera motion, occlusion, motion-blur, poor lighting, sporadic system failures, featureless environments, and the like), the AR system performs a relocalization procedure according to one embodiment to reestablish the pose of the system, which is needed for optimal system performance. The AR system begins the relocalization procedure by capturing one or more images using one or more cameras coupled thereto. Next, the AR system compares a captured image with a plurality of known images to identify a known image that is the closest match to the captured image. Then, the AR system accesses metadata for the closest match known image including pose data, and reestablishes the pose of the system using the pose data of the closest match known image.

FIG. 1 depicts a query image 110, which represents an image captured by the lost AR system. FIG. 1 also depicts a plurality (e.g., six) of known images 112a-112f, against which the query image 110 is compared. The known images 112a-112f may have been recently captured by the lost AR system. In the embodiment depicted in FIG. 1, known image 112a is the closest match known image to the query image 110. Accordingly, the AR system will reestablish its pose using the pose data associated with known image 112a. The pose data may encode a translation and a rotation of a camera corresponding to the closest match known image 112a.

However, comparing a large number (e.g., more than 10,000) of image pairs on the pixel-by-pixel basis is computationally intensive. This limitation renders a pixel-by-pixel comparison prohibitively inefficient for real time (e.g., 60 or more frames per second) pose sensitive system relocalization. Accordingly, FIG. 1 only schematically depicts the image comparison for system relocalization.

According to one embodiment, the query image (e.g., query image 110) and the plurality of known images (e.g., known images 112a-112f) are transformed into data structures that are both easier to process and compare, and easier to store and organize. In particular, each image is "embedded" by projecting the image into a lower dimensional manifold where triangle inequality is preserved. Triangle inequality is the geometric property wherein for any three points not on a line, the sum of any two sides is greater than the third side.

In one embodiment, the lower dimensional manifold is a data structure in the form of an N dimensional vector. In particular, the N dimensional vector may be a 128 dimensional vector. Such a 128 dimensional vector strikes an effective balance between size of the data structure and ability to analyze images represented by the data structure. Varying the number of dimensions of N dimensional vectors for an image based localization/relocalization method can affect the speed of similarity metric computation and end-to-end training (described below). All other factors being equal, the lowest dimensional representation is preferred. Using 128 dimensional vectors results in a lean, yet robust embedding for image based localization/relocalization methods. Such vectors can be used with convolutional neural networks, rendering the localization/relocalization system improvable with new data, and efficiently functional on new data sets.

Figure 2:
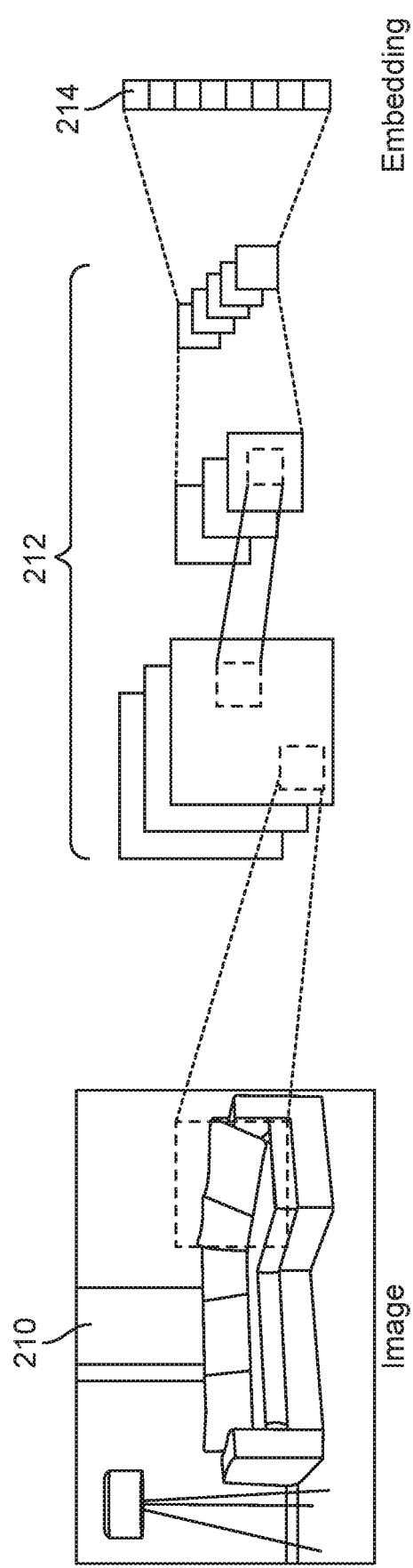
FIG. 2 is a schematic view of an embedding of an image to a data structure, according to one embodiment.

FIG. 2 schematically depicts the embedding of an image 210 through a series of analysis/simplification/reduction steps 212. The image 210 may be a 120 pixel×160 pixel image. The result of the operations in step 212 on the image 210 is an N dimensional vector 214 (e.g., 128 dimensional) representing the image 210. While the embodiments described herein utilize a 128 dimensional vector as a data structure, any other data structure, including vectors with a different number of dimensions, can represent the images to be analyzed in localization/relocalization systems according to the embodiments herein.

For localization/relocalization, this compact representation of an image (i.e., an embedding) may be used to compare the similarity of one location to another by comparing the Euclidean distance between the N dimensional vectors. A network of known N dimensional vectors corresponding to known training images, trained with both indoor and outdoor location based datasets (described below), may be configured to learn visual similarity (positive images) and dissimilarity (negative images). Based upon this learning process, the embedding is able to successfully encode a large degree of appearance change for a specific location or area in a relatively small data structure, making it an efficient representation of locality in a localization/relocalization system.

Network Training

Figure 3:
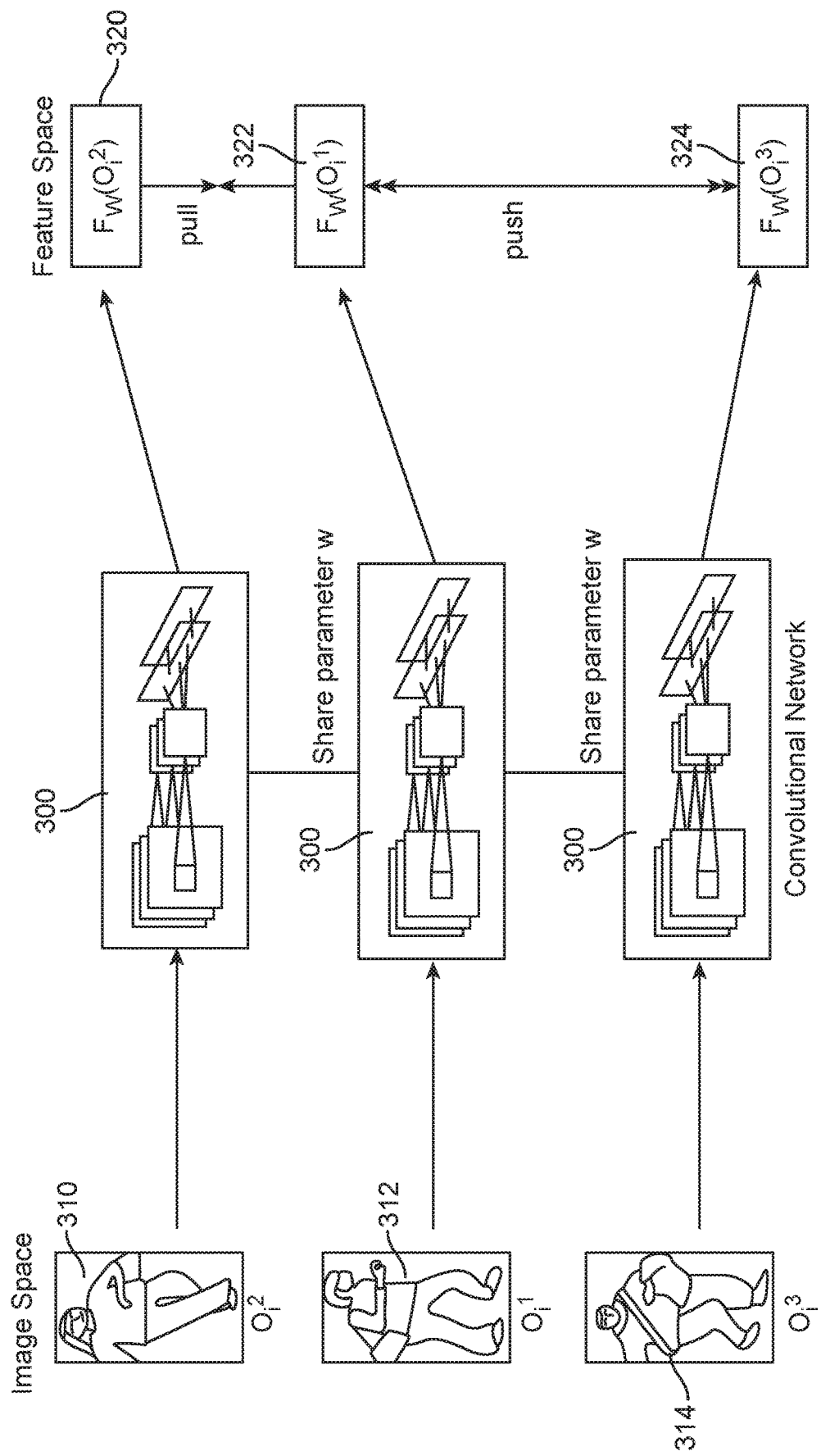
FIG. 3 is a schematic view of a method for training a neural network, according to one embodiment.

Networks must be trained before they can be used to efficiently embed images into data structures. FIG. 3 schematically depicts a method for training a network 300 using image triplets 310, 312, 314, according to one embodiment. The network 300 may be a convolutional neural network 300. The network training system uses a query image 312, a positive (matching) image 310, and a negative (non-matching) image 314 for one cycle of training. The query and positive images 312, 310 in FIG. 3 each depict the same object (i.e., a person), perhaps from different points of view. The query and negative images 312, 314 in FIG. 3 depict different objects (i.e., people). The same network 310 learns all of the images 310, 312, 314, but is trained to make the scores 320, 322 of the two matching images 310, 312 as close as possible and the score 324 of the non-matching image 314 as different as possible from the scores 320, 322 of the two matching images 310, 312. This training process is repeated with a large set of images.

When training is complete, the network 300 maps different views of the same image close together and different images far apart. This network can then be used to encode images into a nearest neighbor space. When a newly captured image is analyzed (as described above), it is encoded (e.g., into an N dimensional vector). Then the localization/relocalization system can determine the distance to the captured image's nearest other encoded images. If it is near to some encoded image(s), it is considered to be a match for that image(s). If it is far from some encoded image, it is considered to be a non-match for that image. As used in this application, "near" and "far" include, but are not limited to, relative Euclidean distances between two poses and/or N dimensional vectors.

Learning the weights of the neural network (i.e., the training algorithm) includes comparing a triplet of known data structures of a plurality of known data structures. The triplet consists of a query image, positive image, and negative image. A first Euclidean distance between respective first and second pose data corresponding to the query and positive images is less than a predefined threshold, and a second Euclidean distance between respective first and third pose data corresponding to the query and negative images is more than the predefined threshold. The network produces a 128 dimensional vector for each image in the triplet, and an error term is non-zero if the negative image is closer (in terms of Euclidean distance) to the query image than the positive. The error is propagated through the network using a neural network backpropagation algorithm. The network can be trained by decreasing a first Euclidean distance between first and second 128 dimensional vectors corresponding to the query and positive images in an N dimensional space, and increasing a second Euclidean distance between first and third 128 dimensional vectors respectively corresponding to the query and negative images in the N dimensional space. The final configuration of the network is achieved after passing a large number of triplets through the network.

It is desirable for an appearance based relocalization system generally to be invariant to changes in viewpoint, illumination, and scale. The deep metric learning network described above is suited to solving the problem of appearance-invariant relocalization. In one embodiment, the triplet convolutional neural network model embeds an image into a lower dimensional space where the system can measure meaningful distances between images. Through the careful selection of triplets, consisting of three images that form an anchor-positive pair of similar images and an anchor-negative pair of dissimilar images, the convolutional neural network can be trained for a variety of locations, including changing locations.

While the training embodiment described above uses triplets of images, network training according to other embodiments, may utilize other pluralities of images (e.g., pairs and quadruplets). For image pair training, a query image may be sequentially paired with positive and negative images. For image quadruplet training, a quadruplet should include at least a query image, a positive image, and a negative image. The remaining image may be an additional positive or negative image based on the intended application for which the network is being trained. For localization/relocalization, which typically involves more non-matches than matches, the fourth image in quadruplet training may be a negative image.

While the training embodiment described above uses a single convolutional neural network, other training embodiments may utilize multiple operatively coupled networks. In still other embodiments, the network(s) may be other types of neural networks with backpropagation.

Exemplary Network Architecture

An exemplary neural network for use with localization/relocalization systems according to one embodiment has 3×3 convolutions and a single fully connected layer. This architecture allows the system to take advantage of emerging hardware acceleration for popular architectures and the ability to initialize from ImageNet pre-trained weights. This 3×3 convolutions architecture is sufficient for solving a wide array of problems with the same network architecture.

This exemplary neural network architecture includes 8 convolutional layers and 4 max pooling layers, followed by a single fully connected layer of size 128. A max pooling layer is disposed after every two convolutional blocks, ReLU is used for the non-linearity, and BatchNorm layers are disposed after every convolution. The final fully connected layer maps a blob of size [8×10×128] to a 128×1 vector, and a custom differentiable L2-normalization provides the final embedding.

Localization/Relocalization Systems and Methods

Figure 4:
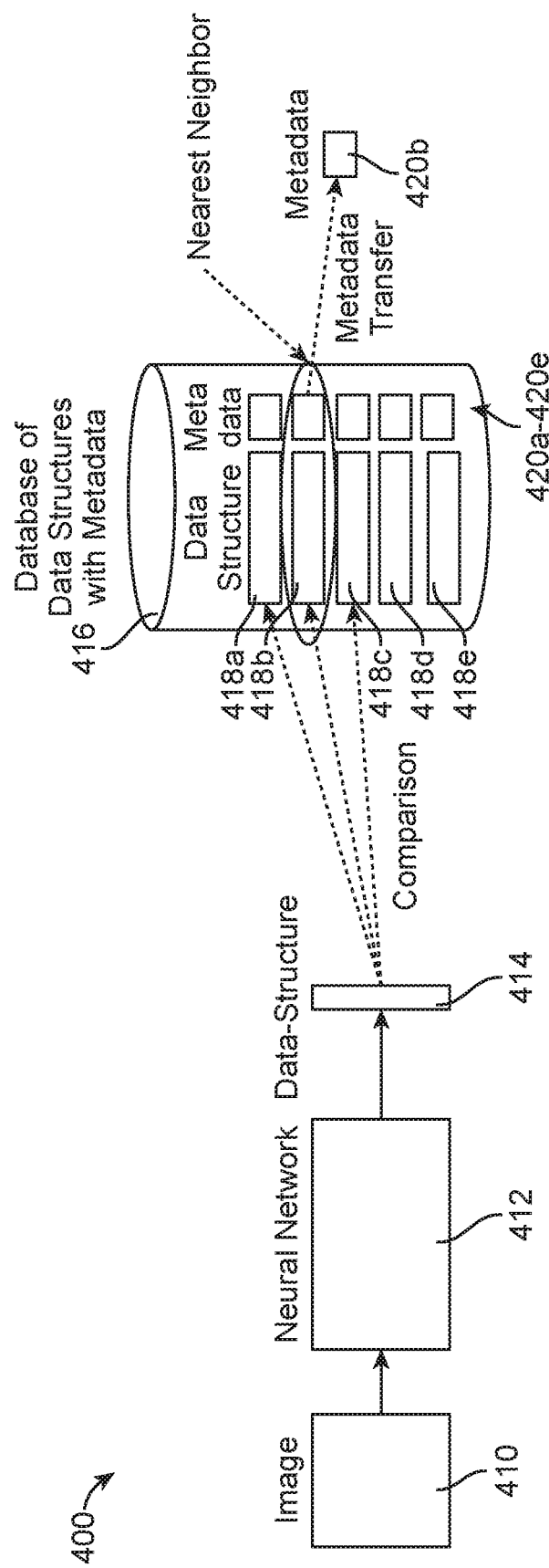
FIG. 4 is a schematic view of data flow in a method for localizing/relocalizing a pose sensitive system, according to one embodiment.
Figure 5:
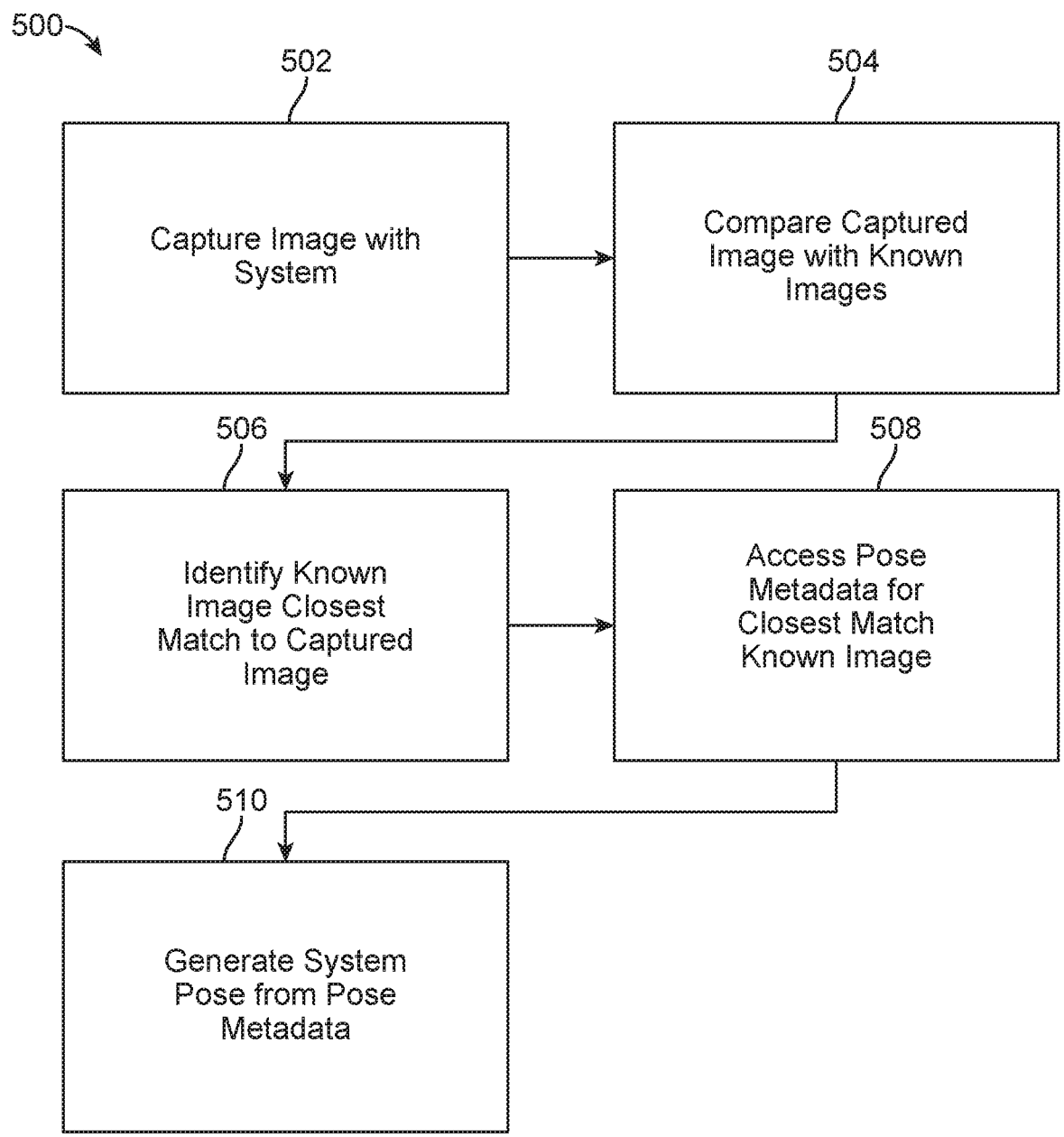
FIG. 5 is a flow chart depicting a method for localizing/relocalizing a pose sensitive system, according to one embodiment.

Now that the training of the convolutional neural network according to one embodiment has been described, FIGS. 4 and 5 depict two similar methods 400, 500 of localizing/relocalizing a pose sensitive system according to two embodiments.

FIG. 4 schematically depicts a query image 410, which is embedded by a neural network 412 into a corresponding query data structure 414. The query image 410 may have been acquired by a lost pose sensitive system for use in relocalization. The neural network 412 may be a trained convolutional neural network (see 300 in FIG. 3). The query data structure 414 may be a 128 dimensional vector.

The query data structure 414 corresponding to the query image 410 is compared to a database 416 of known data structures 418a-418e. Each known data structures 418a-418e is associated in the database 416 with corresponding metadata 420a-420e, which includes pose data for the system which captured the known image corresponding to the known data structure 418. The result of the comparison is identification of the nearest neighbor (i.e., best match) to the query data structure 414 corresponding to the query image 410. The nearest neighbor is the known data structure (e.g., the known data structure 418b) having the shortest relative Euclidean distances to the query data structure 414.

After the nearest neighbor known data structure, 418b in this embodiment, has been identified, the associated metadata 420b is transferred to the system. The system can then use the pose data in the metadata 420b to localize/relocalize the previously lost pose sensitive system.

FIG. 5 is a flow chart depicting a method 500 of image based localization/relocalization. At step 502, a pose sensitive system without pose information captures an image. At step 504, the system compares the captured image with a plurality of known images. At step 506, the system identifies the known image that is the closest match to the captured image. At step 508, the system accesses pose metadata for the closest match known image. At step 510, the system generates pose information for itself from the pose metadata for the closest match known image.

Relocalization using a triplet convolutional neural network outperforms current relocalization methods in both accuracy and efficiency.

Image Based Mapping

When a localizing/relocalizing system is used to form a map based on encoded images, the system obtains images of a location, encodes those pictures using the triplet network, and locates the system on the map based on a location corresponding to the closest image(s) to the obtained images.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of determining a pose of an image capture device, comprising
   capturing an image using an image capture device;
   generating a data structure corresponding to the captured image;
   comparing the data structure with a plurality of known data structures to identify a most similar known data structure;
   reading metadata corresponding to the most similar known data structure to determine a pose of the image capture device; and
   training a neural network by mapping a plurality of known images to the plurality of known data structures,
   wherein the data structure is an N dimensional vector,
   wherein generating the data structure corresponding to the captured image comprises using a neural network to map the captured image to the N dimensional vector,
   wherein each known image of the plurality has respective metadata including pose data, and
   wherein training the neural network comprises:
      accessing a database of the known images annotated with the respective metadata;
      decreasing a first Euclidean distance between first and second known N dimensional vectors respectively corresponding to matching first and second known images in an N dimensional space; and
      increasing a second Euclidean distance between first and third known N dimensional vectors respectively corresponding to non-matching first and third known images in the N dimensional space.

2. The method of claim 1, wherein the data structure is a compact representation of the captured image.

3. The method of claim 1, wherein the neural network is a convolutional neural network.

4. The method of claim 1, wherein the data structure is a 128 dimensional vector.

5. The method of claim 1, wherein each of the plurality of known data structures is a respective known N dimensional vector in an N dimensional space.

6. The method of claim 5, wherein comparing the data structure with the plurality of known data structures to identify the most similar known data structure comprises
   determining respective Euclidean distances between the N dimensional vector and each respective known N dimensional vector, and
   identifying a known N dimensional vector having a smallest distance to the N dimensional vector as the most similar known data structure.

7. The method of claim 1, wherein each of the plurality of known data structures is a respective known 128 dimensional vector in a 128 dimensional space.

8. The method of claim 1, wherein the neural network is a convolutional neural network.

9. The method of claim 1, wherein training the neural network comprises modifying the neural network based on comparing a triplet of known images of the plurality.

10. The method of claim 9, wherein each known data structure of the plurality is a respective known N dimensional vector in an N dimensional space,
    wherein a first known image of the triplet is a matching image for a second known image of the triplet, and
    wherein a third known image of the triplet is a non-matching image for the first known image of the triplet.

11. The method of claim 1, wherein the pose data encodes a translation and a rotation of a camera corresponding to a known image.

12. The method of claim 1, wherein a first Euclidean distance between respective first and second pose data corresponding to the matching first and second known images is less than a predefined threshold, and
wherein a second Euclidean distance between respective first and third pose data corresponding to the non-matching first and third known images is more than the predefined threshold.

13. The method of claim 1, further comprising comparing the data structure with the plurality of known data structures to identify the most similar known data structure in real time.

14. The method of claim 1, wherein the metadata corresponding to the most similar known data structure includes pose data corresponding to the most similar known data structure.

15. The method of claim 14, further comprising determining a pose of the image capture device from the pose data in the metadata of the most similar known data structure.

* * * * *